US006698837B2

(12) United States Patent
Pejathaya et al.

(10) Patent No.: US 6,698,837 B2
(45) Date of Patent: Mar. 2, 2004

(54) SEAT ASSEMBLY WITH INTEGRATED RECLINER AND FLOOR-LATCH MECHANISM

(75) Inventors: Srinivas Pejathaya, St. Clair Shores, MI (US); Jeffery T. Bonk, Clinton Township, MI (US)

(73) Assignee: Fisher Dynamics Corproration, St. Clair Shores, MI (US)

( * ) Notice: Subject to any disclaimer, the term of this patent is extended or adjusted under 35 U.S.C. 154(b) by 31 days.

(21) Appl. No.: 10/278,414

(22) Filed: Oct. 23, 2002

(65) Prior Publication Data
US 2003/0102705 A1 Jun. 5, 2003

Related U.S. Application Data
(60) Provisional application No. 60/334,850, filed on Nov. 30, 2001.

(51) Int. Cl.[7] .................................................. B60N 2/20
(52) U.S. Cl. ............. 297/378.12; 297/336; 297/378.13; 296/65.03; 296/65.09
(58) Field of Search ........................ 297/378.13, 378.12, 297/331, 336; 296/65.03, 65.08, 65.09

(56) References Cited

U.S. PATENT DOCUMENTS

| | | | | |
|---|---|---|---|---|
| 5,393,116 A | * | 2/1995 | Bolsworth et al. ... | 296/65.03 X |
| 5,941,591 A | * | 8/1999 | Tsuge et al. ............. | 296/65.09 |
| 6,123,380 A | * | 9/2000 | Sturt et al. ................ | 296/65.09 |
| 6,158,800 A | * | 12/2000 | Tsuge et al. ............. | 296/65.09 |

* cited by examiner

Primary Examiner—Anthony D. Barfield
(74) Attorney, Agent, or Firm—Harness, Dickey & Pierce, P.L.C.

(57) ABSTRACT

A seat recliner and latch includes a housing, an upper quadrant rotationally supported by the housing, a recliner mechanism supported by the housing and operably engaging the upper quadrant, a latch mechanism pivotally supported by the housing and operable to selectively engage a floor striker. An actuation mechanism is in operable communication with the recliner and latch mechanisms, and is operable in a first position, whereby the recliner mechanism enables rotational adjustment of the upper quadrant, and in a second position whereby the latch mechanism disengages the striker. The latch mechanism is pivotally supported about a pivot axis, wherein the latch mechanism rotates thereabout as the seat folds about a remote axis. An interlock is engaged with latch mechanism and is in selective engagement with the quadrant. The interlock limits a range of rotation of the quadrant when the latch mechanism disengages the striker.

25 Claims, 15 Drawing Sheets

SEAT ASSEMBLY WITH INTEGRATED RECLINER AND FLOOR-LATCH MECHANISM

FIELD OF THE INVENTION

The present invention relates to recliner and floor-latch mechanisms for a seat assembly and, more particularly, to integrated recliner and floor-latch mechanisms for a seat assembly.

BACKGROUND OF THE INVENTION

Seat assemblies, such as those used in vehicles, generally include a recliner mechanism for enabling reclining motion of a seat-back relative to a seat. Many seat assemblies include the ability of being folded about a forward pivot to provide added floor space within a vehicle or access to an otherwise obstructed space. To enable reclining and stowing operation of the seat assembly, integrated recliner and floor-latch mechanisms are traditionally provided as an assembly. The floor-latch mechanism typically extend downward from the seat for selective engagement with a floor. Generally, actuation of a lever in a first direction actuates the recliner mechanism to enable reclining motion of the seat-back relative to the seat. Further actuation of the lever actuates the floor-latch mechanism to release the seat assembly from engagement with the floor to enable forward pivoting of the complete seat assembly.

Traditional seat assemblies suffer from the particular disadvantage that even though the seat assembly may not be properly engaged with the floor, the seat-back is fully actuable and positionable relative to the seat. In this manner, an occupant may falsely believe that the seat assembly is properly secured to the floor via the floor-latch mechanism and occupy the seat. Improper securing of the seat assembly to the floor is a potentially dangerous situation, especially in the event of an accident. A second disadvantage of such traditional seat assemblies is that the downward extending floor-latch mechanism obstructs vehicle access, as it projects outward from the seat assembly when in the forward dump or stowed position.

Therefore, it is desirable in the industry to provide a combination seat recliner and floor-latch assembly that includes seat recliner and floor-latch mechanisms on both sides of a seat. Also, the seat recliner and floor-latch mechanisms should be operable from a single actuation lever. The actuation lever should be preferably operable to a first position for enabling actuation of the recliner mechanisms and to a second position for enabling actuation of the floor-latch mechanisms.

It is also desirable in the industry to provide an interlock for a seat recliner and floor-latch mechanism that prohibits seat-back return from a forward-folded position in the event that the floor latch is not properly secure.

It is further desirable in the industry to provide a dynamic recliner and floor-latch mechanism that enables stowing motion of the floor latch as the seat pivots to a dump position to improve access to the space behind the seat.

SUMMARY OF THE INVENTION

Accordingly, the present invention provides a seat latch and recliner apparatus. The seat latch and recliner apparatus is implemented with a seat that is selectively engageable with a floor having first and second strikers, and is pivotal about a remote axis relative to the floor. The seat recliner and latch apparatus includes a first and second apparatus halves. The first apparatus half has a first housing, a first quadrant rotationally supported by the first housing, a first recliner mechanism supported by the housing and in operable engagement with the first quadrant, and a first latch mechanism supported by the housing and in operable engagement with the first recliner mechanism. The second apparatus half has a second housing, a second quadrant rotationally supported by the second housing, a second recliner mechanism supported by the second housing and operably engaging the second quadrant, and a second latch mechanism pivotally supported by the second housing and operable to selectively engage the second striker of the floor. An actuation mechanism is included and is in operable communication with the first and second recliner mechanisms and the first and second latch mechanisms. The actuation mechanism is operable in a first position, whereby the first and second recliner mechanisms are operable for enabling selective rotational adjustment of the first and second quadrants relative to the first and second housings, and in a second position, whereby the first and second latch mechanisms are operable for disengaging the first and second strikers.

The seat recliner and latch apparatus further includes a pivot axis, about which the second latch mechanism is pivotally supported. The second latch mechanism rotates about the pivot axis as the seat pivots about the remote axis.

Additionally, the seat recliner and latch apparatus includes an interlock operably engaged with the second latch mechanism, and in selective engagement with the first quadrant. The interlock limits a range of rotation of the first quadrant when the second latch mechanism is disengaged from the second striker.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 7:
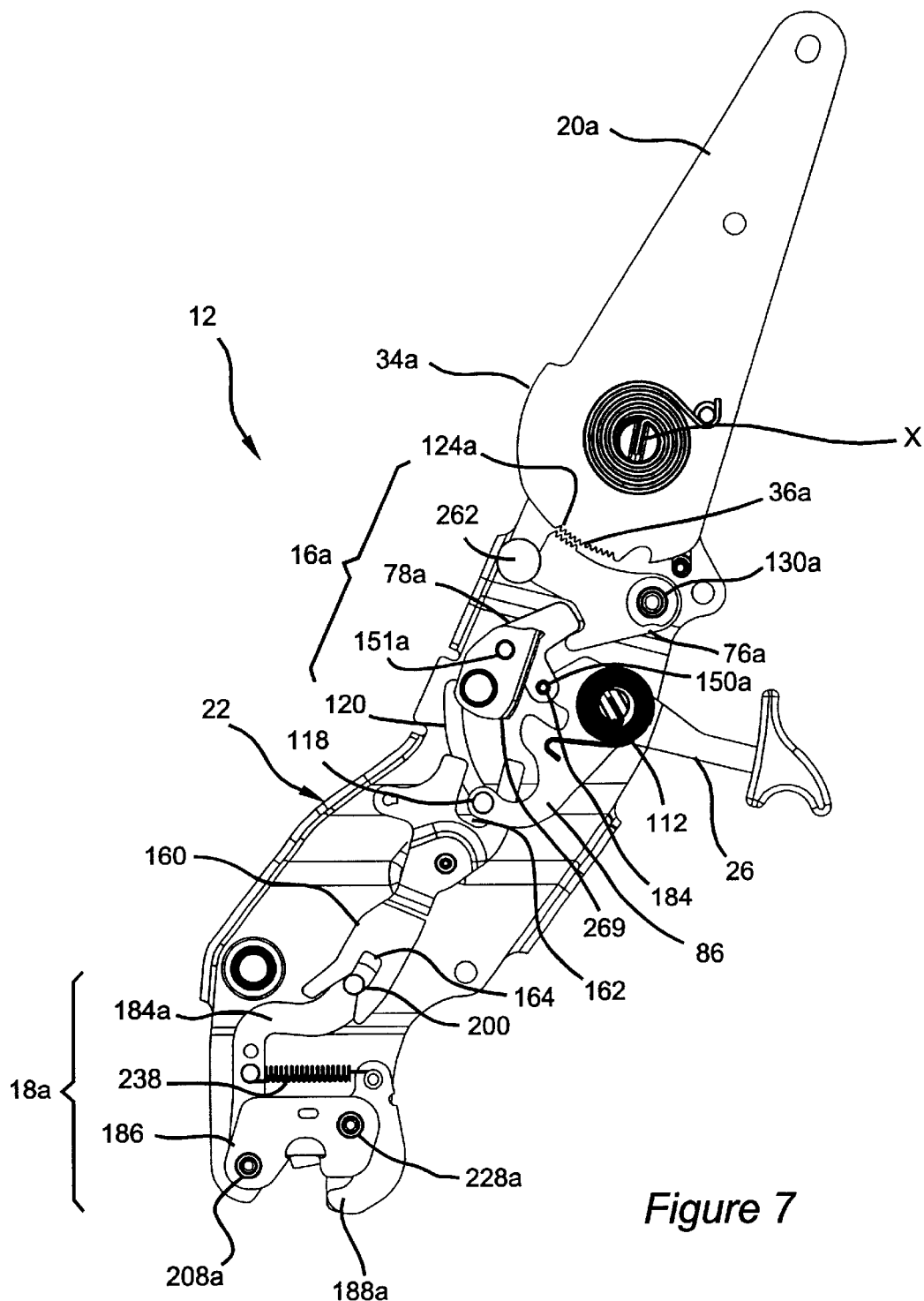
FIG. 7 is a side view of the first half of the recliner and floor-latch assembly in a fully actuated state.
Figure 8:
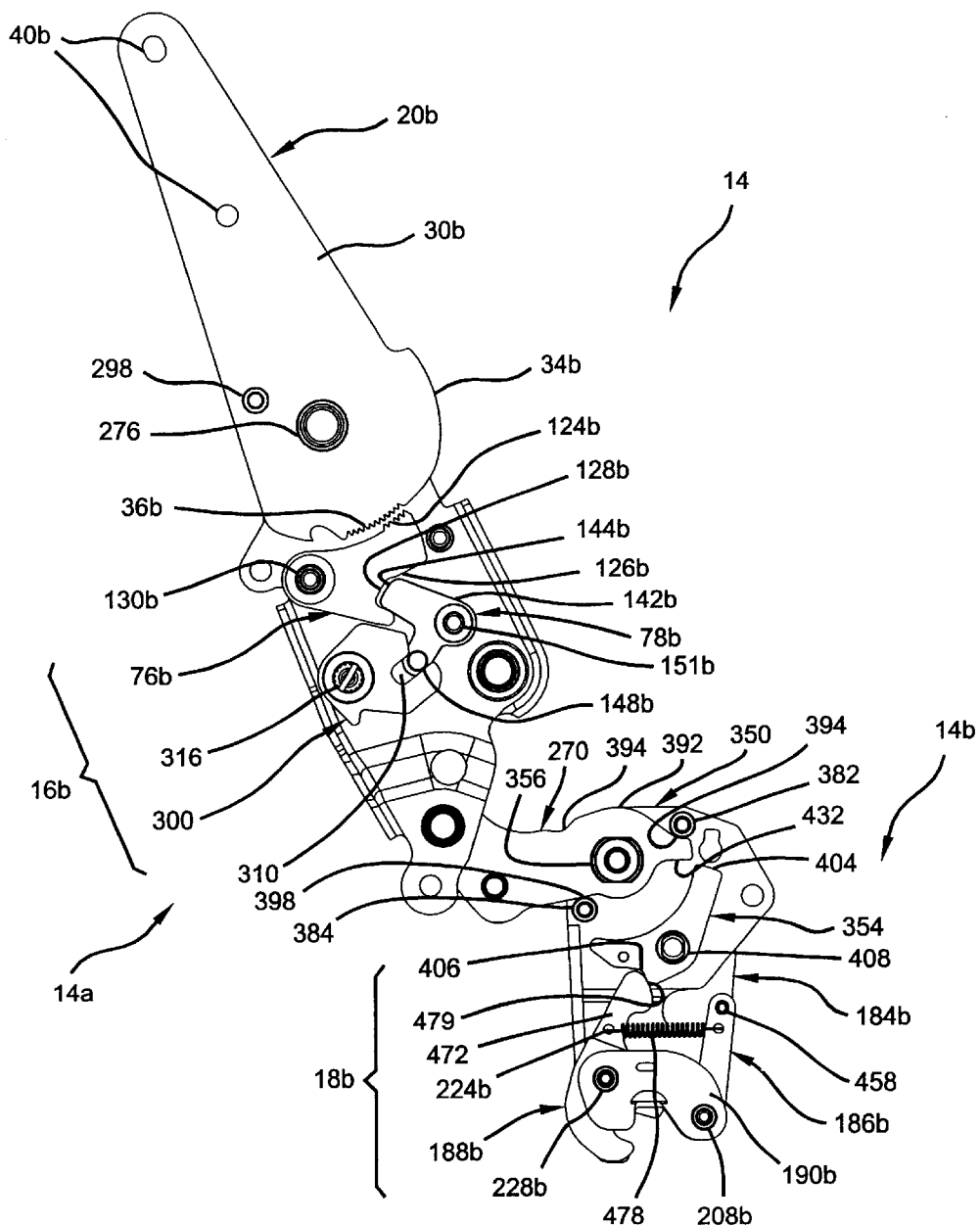
FIG. 8 is a side view of the first half of the recliner and floor-latch assembly in a fully actuated state.
Figure 9:
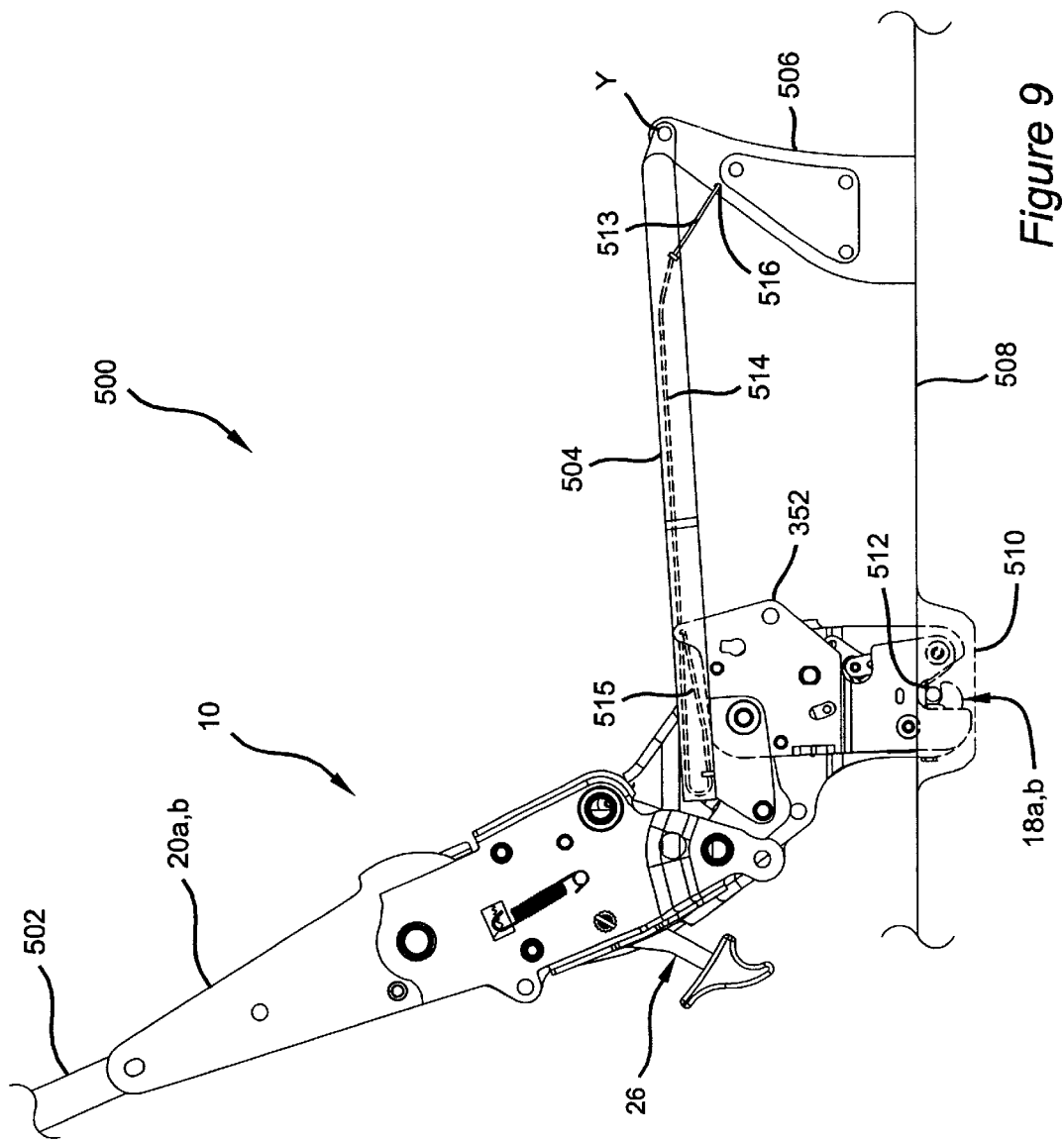
FIG. 9 is a side view of a seat assembly including the recliner and floor-latch assembly according to the present invention.
Figure 10:
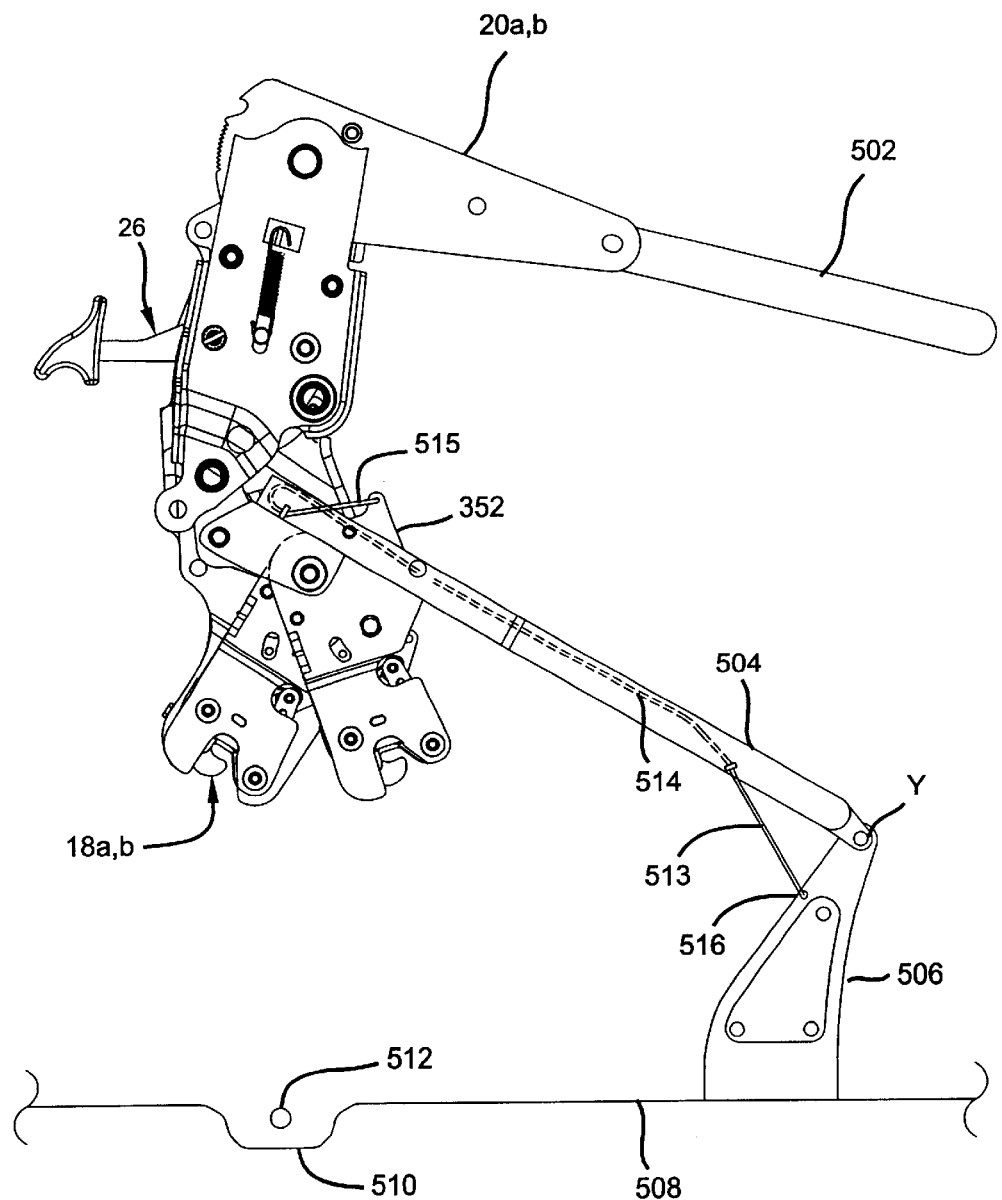
FIG. 10 is a side view of the seat assembly of FIG. 9 in a partially dumped position.
Figure 11:
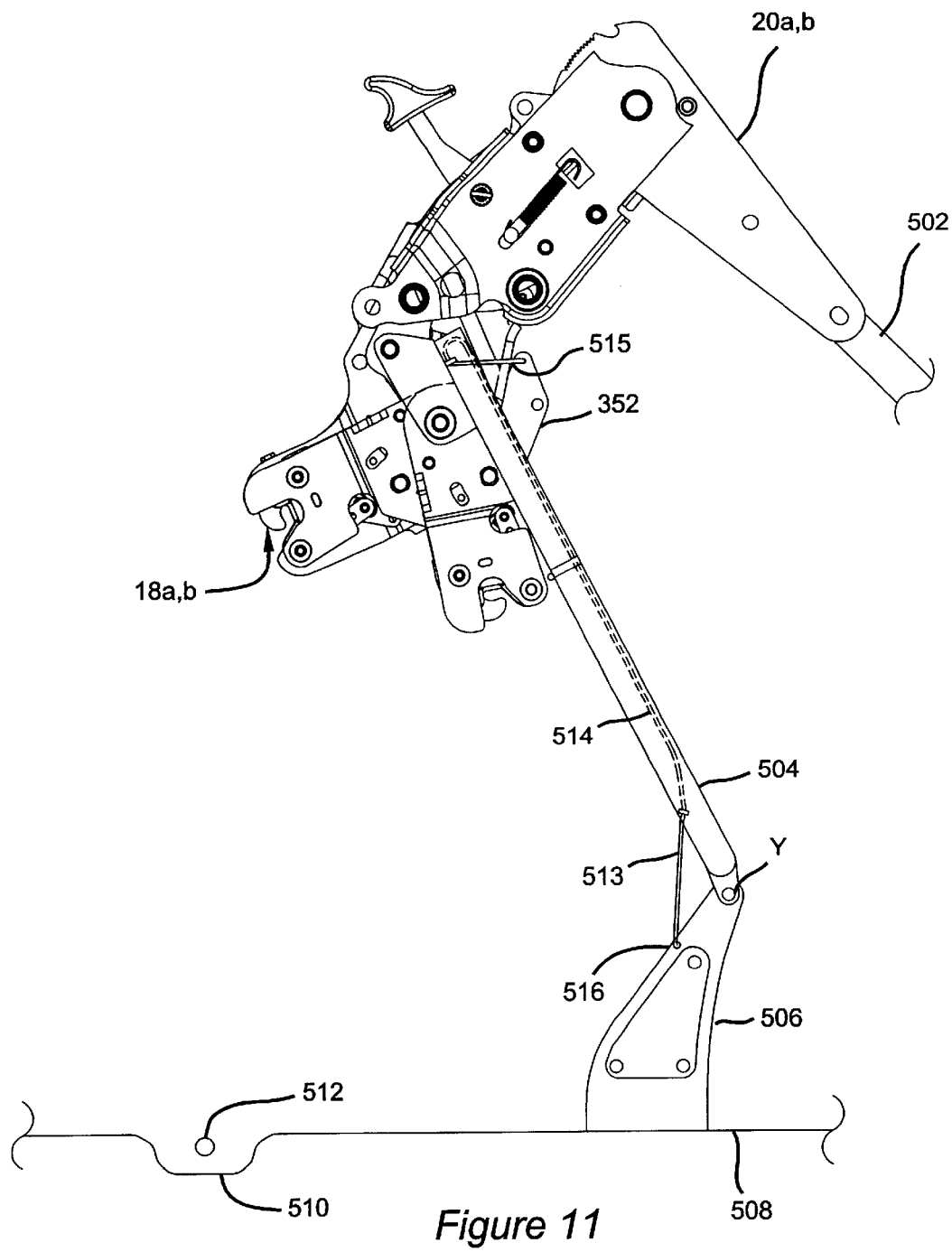
FIG. 11 is a side view of the seat assembly of FIG. 7 in a fully dumped position.

With reference to FIGS. 1 through 8, a combination recliner and floor-latch (RFL) assembly 10 for use with a seat assembly and operable in a first mode to enable recline or forward folding of a seat back relative to a seat and in a second mode to enable forward dumping of a seat assembly. The RFL mechanism 10 includes operably interconnected first and second RFL halves 12,14 respectively including recliner mechanisms 16a, 15b and floor-latch mechanisms 18a, 18b. Also provided are upward extending seat-back supports 20a, 20b operably interconnected with the recliner mechanisms 16a, 16b for selectively positioning the seat-back supports about an axis X. The floor-latch mechanisms 18a, 18b selectively engage a pair of strikers disposed on a floor for securing the seat assembly thereto, as shown in FIGS. 9–11 and discussed in further detail below.

The first RFL half 12 includes inner and outer plates 22,24 between which the recliner mechanism 16a and floor-latch mechanism 18a are operably supported. The seat-back support 20a is pivotally supported between the inner and outer plates 22,24 and is in selective engagement with the recliner mechanism 18a for pivotally positioning the seat-back support 20a. An actuation lever 26 is pivotally supported between the inner and outer plates 22,24 and is in operable engagement with the recliner mechanism 16a and the floor-latch mechanism 18a, as well as the recliner mechanism 16b of the second RFL half 14.

The seat-back support 20a includes a generally triangular-shaped plate 30a having a pivot aperture 32a therethrough and an arcuate edge 34a. A portion of the arcuate edge 34a includes a plurality of teeth 36a formed therein and an interlock notch 38a. Auxiliary apertures 40a are provided for attachment of a seat-back frame thereto. The seat-back support 20a is pivotally supported between the inner and outer plates 22,24 by a seat-back support pivot 42. The seat-back support pivot 42 includes a disc end 44, a keyed cylindrical section 46, a first cylindrical section 54 having a bearing surface 50, a second cylindrical section 52, and a third cylindrical section 54 having a diametric notch 56 formed therein. The support pivot 42 is received through a keyed aperture 58 of the inner plate 22, the pivot aperture 32a of the seat-back support 20a and a pivot aperture 60 of the outer plate 24. The keyed cylindrical section 46 aligns with the keyed aperture 58 of the inner plate 22 for fixing the support pivot 42 from rotating relative to the inner and outer plates 22,24. The first cylindrical section 48 aligns within the pivot aperture 32a of the seat-back support 20a, whereby the seat-back support 20a pivots on the bearing surface 50. The second cylindrical extension 52 aligns with the pivot aperture 60 of the outer plate 24 and the third cylindrical section 54 extends therefrom.

The seat-back support 20a is biased by a coil spring 62 including a central flat 64 that engages the diametric notch 56 of the third cylindrical section 54 and an outwardly extending arm 66 that engages a post 68 extending from the seat-back support 20a. In this manner, as the seat-back support 20a is caused to pivot clockwise (CW) relative to the view shown in FIG. 2, or recline, the post 68 engages the extending arm 66 to bias against the reclining motion.

A top edge 70 of the inner plate 22 and a top edge 72 of the outer plate 24 each include a generally arcuate shape having seats 74 formed at either end. As the seat-back support 20a is caused to pivot relative to the inner and outer plates 22,24, the post 68 may abut the seats 74 to prohibit further pivotal motion of the seat-back support 20a relative to the inner and outer plates 22,24. In this manner, a range of pivotal motion of the seat-back support 20a is defined.

The recliner mechanism 16a includes a pawl 76a and a recliner cam 78a pivotally supported between the inner and outer plates 22,24. The recliner cam 78a selectively biases the pawl 76a into engagement with the seat-back support 20a to fix the seat-back support 20a in position. The recliner cam 78a is operably interconnected to an actuation lever 26, whereby movement of the actuation lever 26 concurrently moves the recliner cam 78a to selectively engage or disengage the pawl 76a.

The actuation lever 26 generally includes a flat plate having a lever arm 80, a keyed spindle aperture 82, an actuation notch 84 and a curving transfer arm 86. The actuation lever 26 is pivotally supported between the inner and outer plates 22,24 by a spindle 88. The spindle 88 includes a conical cylinder section 90 having flats 92 and notches 94 formed therein, a second cylinder section 96 having a bearing surface 98, a keyed cylindrical section 100 having keys 102 formed therein, a central disc-shaped section 104 and a fourth cylindrical section 106 including a notch 108 formed therein. The spindle 88 is received through the spindle aperture 82 whereby the keys 102 of the keyed cylindrical section 100 align with keys of the spindle aperture 82 for prohibiting relative rotational motion of the spindle 88 within the spindle aperture 82. The spindle 88 is further disposed through a pair of support apertures 107 of the inner and outer plates 22,24, supporting the spindle 88 therebetween.

The actuation lever 26 is rotationally biased in a neutral position by a coil spring 110. The coil spring 110 includes a central flat 112 and an outwardly extending arm 114. The central flat 112 is received by the notch 108 of the fourth cylindrical section 106 and the extending arm 114 engages an anchor point 116 on the outer plate 24. As the actuation lever 26 is caused to rotate from the neutral position, the coil spring 110 biases the actuation lever 26 back towards the neutral position. The curving transfer arm 86 includes a transfer rivet 118 extending perpendicularly from the transfer arm 86, and partially disposed within an arcuate aperture 120 of the inner plate 22, whereby a range of motion for the actuation lever 26 is defined.

The pawl 76a includes a pivot aperture 122a, a plurality of teeth 124a, an engagement flat 126a and a disengagement recess 128a. The plurality of teeth 124a of the pawl 76a selectively engage the plurality of teeth 36a of the seat-back support 20a for defining a plurality of pivotal positions (i.e., recline positions) of the seat-back support 20a relative to the inner and outer plates 22,24. The pawl 76a is pivotally supported by a pawl spindle 130a that includes a central cylindrical section 132a having a bearing surface 134a and smaller, extending side cylindrical sections 136a. The central cylindrical section 132a aligns with the pivot aperture 122a of the pawl 76a and the side cylindrical sections 136a are received into apertures 138a of the inner and outer plates 22,24, respectively.

A spacer 129 is further provided for spacing the inner and outer plates 22,24. The spacer 129 includes a central cylindrical section 131 and side cylindrical sections 133. The side cylindrical sections 133 are received into apertures 137 of the inner and outer plates 22,24, whereby the spacer 129 is supported therebetween. A width of the central cylindrical section 131 defines a distance between the inner and outer plates 22,24.

The recliner cam 78a includes a pivot aperture 140a, an engagement arm 142a having an engagement edge 144a, and an actuation arm 146a having a post aperture 148a formed therethrough. The engagement arm 142a of the recliner cam 78a selectively engages the engagement flat 126a and the disengagement recess 128a of the pawl 76a. An actuation post 150a is disposed through the post aperture 148a of the recliner cam 78a and extends perpendicularly therefrom to engage the actuation notch 84 of the actuation lever 26 and extends through an arcuate slot 152 of the inner plate 22. As the actuation lever 26 is caused to pivot from the neutral position, edges of the actuation notch 84 force the actuation post 150a into engagement with the recliner cam 78a, thereby causing the recliner cam 78a to move. In an engaged position, the engagement edge 144a of the recliner cam 78a pushes up against the engagement flat 126a of the pawl 76a, forcing the pawl 76a into engagement with the seat-back support 20a. In a disengaged position, the engagement arm 142a is positioned within the disengagement recess 128b of the pawl 76a, enabling the pawl 76a to disengage the seat-back support 20a.

The recliner cam 78a is pivotally supported between the inner and outer plates 22,24 about a pivot 151a. The pivot 151a includes a central disc section 153a, a cylindrical section 155a having a bearing surface 157a and side cylindrical sections 159a. The pivot 151a is disposed through the pivot aperture 140a for rotatably supporting the recliner cam 78a about the bearing surface 157a. The side cylindrical sections 159a are received into apertures 161 of the inner and outer plates 22,24 for supporting the pivot 151a therebetween.

The floor-latch mechanism 18a is in operable communication with the actuation lever 26 through a transfer lever 160, which is pivotally supported between the inner and outer plates 22,24 and includes an upper transfer notch 162, a lower transfer notch 164, a rivet aperture 166, and a transfer cable attachment point 168. The transfer lever 160 is pivotally supported by a rivet 170 that includes a disc end 172, a first cylindrical section 174 having a bearing surface 176, and a second cylindrical section 178. The rivet 170 is received through the rivet aperture 166 of the transfer lever 160 with the first cylindrical section 174 aligning with the rivet aperture 166 and the second cylindrical section 174 extending through an aperture 180 of the outer plate 24. The second cylindrical section 178 is deformable for securing the transfer lever 160 to the outer plate 24, while enabling pivotal motion of the transfer lever 160 about the bearing surface 176. The upper transfer notch 162 of the transfer lever 160 is in selective engagement with the transfer rivet 118 of the actuation lever 26. Sufficient rotation of the actuation lever 26 enables engagement of the transfer rivet 118 and upper transfer notch 162 of the transfer lever 160 for impairing CW rotation thereof. The lower transfer notch 164 is operably engaged with the floor-latch mechanism 18a. A transfer cable 182 is attached to the transfer cable attachment point 168 and operably interconnects the transfer lever 160 with the second RFL half 14 for enabling concurrent actuation thereof.

A spacer 181 is provided for spacing the inner and outer plates 22,24. The spacer 181 includes a central cylindrical section 183 and side cylindrical sections 185. The side cylindrical sections 185 are received into apertures 187 of the inner and outer plates 22,24 and is supported therebetween. A width of the central cylindrical section 183 defines a distance between the inner and outer plates 22,24.

The floor-latch mechanism 18a includes a latch-release lever 184a, a locking lever 186a and a latch 188a, each of which is pivotally supported between support plates 190a. The latch-release lever 184 includes a pivot aperture 192, an attachment aperture 194, a spring aperture 196 and an upper arm 198 having a transfer rivet 200 extending therefrom and in engagement with the lower transfer notch 164 of the transfer lever 160. The locking lever 186a includes a pivot aperture 202a, an attachment aperture 204a, and a spring aperture 206a. The latch-release lever 184a and locking lever 186a are adjacently aligned and pivotally supported about a common pivot 208a, which includes a central cylindrical section 210a having a bearing surface 212a and side cylindrical sections 214a. The central cylindrical 210a section is received through the pivot apertures 192,202a of the latch release and locking levers 184a, 186a, and apertures 216a of the support plates 190a. The side cylindrical sections 214a are received into apertures 218 of the inner and outer plates 22,24 for supporting the floor latch 18a therebetween.

The latch 188a includes a latching notch 220a, a pivot aperture 222a, a spring attachment 224a and a locking face 226a. The latch 188a is pivotally supported by the support plates 190a on a pivot 228a having a central cylindrical section 230a with a bearing surface 232a and side cylindrical sections 234a. The central cylindrical section 230a is received through the pivot aperture 222a of the latch 188a and the side cylindrical sections 230a are received through apertures 235a of the support plates 190a and into apertures 236 of the inner and outer plates 22,24 for supporting the floor-latch mechanism 18a therebetween. A spring 238 is anchored between the latch release and locking levers 184a, 186a and the latch 188a. In this manner, a locking nub 240a of the locking lever 186a is biased into engagement with the locking face 226a of the latch 188a for securing the latch 188a.

The support plates 190a each include a striker recess 242a having a top flat 244a and an outward anchor extension 246a. The anchor extensions 246a seat within corresponding apertures 248 of the inner and outer plates 22,24 for supporting the floor-latch mechanism 18a therebetween. The inner and outer plates 22,24 each include a striker aperture 250 for receiving a striker, as discussed in further detail hereinbelow.

The first RFL half 12 further includes an interlock plate 260 to prohibit positioning the seat-back support 20a in a use or upright position if either floor-latch mechanism 18a,b is not properly latched on a striker. The interlock plate 260 is pivotally supported adjacent an outer surface of the outer plate 24 by a pivot 262 and includes an interlock post 264 selectively engagable with the seat-back support 20a through a notch 265 of the outer plate 24. The pivot 262 is supported by the outer plate 24 through an aperture 267. A wire spring 266 is disposed about the pivot 262 to impart a bias force on the interlock plate 260. In this manner, the interlock post 264 is biased toward engagement with the seat-back support 20a. However, an interlock cable 268, supported by a cable bracket 269, operably interconnects the interlock plate 260 and the second RFL half 14. As explained in further detail below, tension on the interlock cable 268 is present when both floor-latch mechanisms 18a, 18b are properly engaged, thereby pulling the interlock plate 260 against the bias of the spring 266 and enabling return of the seat-back support 20a from a forward-fold position to a use or upright position. If, on the other hand, either floor-latch mechanism 18a, 18b is not properly secure, the interlock cable 268 is slack, causing the interlock plate 260 to bias into engagement with the seat-back support 20a by the wire spring 266. In this situation, return rotation of the seat-back support 20a from a forward-fold position causes the interlock post 264 to engage the interlock notch 38a, thereby preventing return of the seat-back support 20a to a use or upright position.

The second RFL half 14 includes a recliner portion 14a and a floor latch portion 14b interconnected by a bracket 270. The recliner portion 14a includes the recliner mechanism 16b operably engaged with the actuation lever 26 of the first RFL half 12. The floor latch portion 14b includes the floor-latch mechanism 18b operably engaged with the transfer lever 160 of the first RFL half 12. As discussed in further detail below, operation of the actuation lever 26 to a first position concurrently operates the recliner mechanisms 16a, 16b of the first and second RFL halves 12,14, and further operation of the actuation lever 26 to a second position concurrently operates the floor-latch mechanisms 18a, 18b of the first and second RFL halves 12,14.

The recliner portion 14a of the second RFL half 14 includes inner and outer plates 272,274 pivotally supporting the seat-back support 20b and the supporting recliner mechanism 16b. The seat-back support 20b includes a generally triangular-shaped plate 30b having a pivot aperture 32b therethrough and an arcuate edge 34b. A portion of the arcuate edge 34b includes a plurality of teeth 36b formed therein and an interlock notch 38b. Auxiliary apertures 40b are provided for attachment of a seat-back frame thereto. The seat-back support 20b is pivotally supported between the inner and outer plates 272,274 by a seat-back support pivot 276. The seat-back support pivot 276 includes a keyed disc end 278, a keyed cylindrical section 280, a first cylindrical section 282 having a bearing surface 284, and a second cylindrical section 286. The support pivot 276 is received through a keyed aperture 288 of the inner plate 272, the pivot aperture 32 of the seat-back support 20b, and a pivot aperture 290 of the outer plate 274. The keyed cylindrical section 280 aligns with the keyed aperture 288 of the inner plate 272 for fixing the support pivot 276 from rotating relative to the inner and outer plates 272,274. The first cylindrical section 282 aligns within the pivot aperture 32b of the seat-back support 20b, whereby the seat-back support 20b pivots on the bearing surface 284 and the second cylindrical extension 286 aligns with the pivot aperture 290 of the outer plate 274.

A top edge 292 of the inner plate 272 and a top edge 294 of the outer plate 274 each include a generally arcuate shape having seats 296 formed at either end. As the seat-back support 20b is caused to pivot relative to the inner and outer plates 272,274, a post 298 extending from an aperture 299 of the seat-back support 206 may abut the seats 296 to prohibit further pivotal motion of the seat-back support 20b relative to the inner and outer plates 272,274. In this manner, a range of pivotal motion of the seat-back support 206 is defined and is equivalent to the range defined by the first RFL half 12.

The recliner mechanism 16b includes a pawl 76b and a recliner cam 78b pivotally supported between the inner and outer plates 272,274. The recliner cam 78b selectively biases the pawl 76b into engagement with the seat-back support 20b to fix the seat-back support 20b in position. The recliner cam 78b is operably interconnected to an actuation plate 300, whereby movement of the actuation plate 300 concurrently moves the recliner cam 78b to selectively engage or disengage the pawl 76b.

The pawl 76b includes a pivot aperture 122b, a plurality of teeth 124b, an engagement flat 126b and a disengagement recess 128b. The plurality of teeth 124b of the pawl 76b selectively engage the plurality of teeth 36b of the seat-back support 20b for defining a plurality of pivotal positions (i.e., recline positions) of the seat-back support 20b relative to the inner and outer plates 272,274. The pawl 76b is pivotally supported by a pawl spindle 130b that includes a central cylindrical section 132b having a bearing surface 134b and smaller, extending side cylindrical sections 136b. The central cylindrical section 132b aligns with the pivot aperture 122b of the pawl 76b and the side cylindrical sections 136b are received into apertures 302 of the inner and outer plates 272,274, respectively.

The recliner cam 78b includes a pivot aperture 140b, an engagement arm 142b having an engagement edge 144b, and an actuation arm 146b having a post aperture 148b formed therethrough. The engagement arm 142b of the recliner cam 78b selectively engages the engagement flat 126b and the disengagement recess 128b of the pawl 76b. An actuation post 160b is disposed through the post aperture 148b of the recliner cam 78b and extends perpendicularly therefrom to engage an actuation notch 310 of the actuation plate 300 and extends through an arcuate slot 312 of the inner and outer plates 272,274. The recliner cam 78b is biased into engagement with the pawl 76b by a spring 313 that is attached between the actuation post 150b and an anchor point 315 formed in the outer plate 274. As the actuation plate 300 is caused to pivot from the neutral position, the actuation notch 310 forces the actuation post 150b into engagement with the recliner cam 78b, thereby causing the recliner cam 78b to move. In an engaged position, the engagement edge 144b of the recliner cam 78b pushes up against the engagement flat 126b of the pawl 76a, forcing the pawl 76a into engagement with the seat-back support 20b. In a disengaged position, the engagement arm 142b is positioned within the disengagement recess 128b of the pawl 76b, enabling the pawl 76b to disengage the seat-back support 20b.

The recliner cam 78b is pivotally supported between the inner and outer plates 272,274 about a pivot 151b. The pivot 151b includes a central disc section 153b, a cylindrical section 155b having a bearing surface 157b and side cylindrical sections 159b. The pivot 151b is disposed through the pivot aperture 140b for rotatably supporting the recliner cam 78b about the bearing surface 157b. The side cylindrical sections 159b are received into apertures 277 of the inner and outer plates 272,274 for supporting the pivot 151b therebetween.

The actuation plate 300 includes the actuation notch 310 and a keyed spindle aperture 314, and is pivotally supported by a spindle 316 operably interconnected with the actuation lever 26 of the first RFL half 12. The spindle 316 includes a conical cylinder section 318 having flats 320 and notches 322 formed therein, a second cylindrical section 324 having a bearing surface 326, a keyed cylindrical section 328 having keys 330 formed therein, a central disc-shaped section 332, and a splined spindle section 334. The spindle 316 is received through apertures 331 of the inner and outer plates 272,274 and the spindle aperture 314, whereby the keys 330 of the keyed cylindrical section 328 align with keys of the spindle aperture 314 for prohibiting relative rotational motion of the spindle 316 within the spindle aperture 314. A transfer rod 340 operably interconnects the spindles 88,316 of the first and second RFL halves 12,14. Further, a second actuation lever or dial (not shown) is attachable to the splined spindle section 334 for actuating the RFL mechanism 10 from the second RFL half 12.

A pair of spacers 341 is further provided for spacing the inner and outer plates 272,274. The spacers 341 each include a central cylindrical section 343 and side cylindrical sections 345. The side cylindrical sections 345 of the spacers 341 are received into apertures 347 of the inner and outer plates 272,274 and are supported therebetween. A width of the central cylindrical sections 343 define a distance between the inner and outer plates 272,274.

The floor-latch portion 14b of the second RFL half 12 includes inner and outer plates 350,352 supporting a release lever 354 and the floor-latch mechanism 18b therebetween. The floor-latch mechanism 18b includes a latch-release lever 184b, a locking lever 186b, and a latch 188b, each of which is pivotally supported between support plates 190b. The floor-latch portion 14b is pivotally supported by the bracket 270 about a pivot 356. The pivot 356 includes a central keyed cylindrical section 358, a pair of side cylindrical sections 360 having bearing surfaces 362, an inwardly extending cylindrical section 364 having a notch 366 formed therein and an outwardly extending, stepped cylindrical section 368. The pivot 356 is received through a keyed aperture 370 of the bracket 270 for prohibiting rotational motion of the pivot 356 therewithin. The side cylindrical sections 360 are received into corresponding apertures 372 of the inner and outer plates 350,352 for enabling rotational motion of the inner and outer plates 350,352 about the bearing surfaces 362. A coil spring 374 biases the floor latch portion 14b to a neutral position relative to the bracket 270. The coil spring 374 includes a central flat 376 disposed within the notch 366 of the pivot 356 and an outwardly extending arm 378 engaging an anchor point 380 formed from the inner plate 350. Further, the outer plate includes an actuation cable attachment point 397 for securing an end of an actuation cable, whereby the floor latch portion 14b can be caused to pivot about the pivot 356.

Upper and lower spacers 382,384 are disposed between the inner and outer plates 350,352. Each spacer 382,384 includes a central cylindrical section 386 and extending side cylindrical sections 388. The side cylindrical sections 388 are disposed within corresponding apertures 390 of the inner and outer plates 350,352 for securing the spacers 382,384 therebetween. The spacers 382,384 are functional to define a range of rotational motion of the floor-latch portion 14b relative to the bracket 270. The bracket 270 includes an upper arcuate face 392 between a pair of seats 394, and a lower arcuate face 396 between a pair of seats 398. In the neutral position, the upper spacer 382 abuts the seat 394 and the lower spacer 384 abuts the seat 398. As the floor-latch portion 14b is caused to rotate, as described in further detail below, the upper and lower spacers 382,384 respectively rotate about the upper and lower arcuate faces 392,396, ultimately abutting the seat 394 and seat 398, respectively.

The release lever 354 includes a pivot aperture 400, a post aperture 402, an upper engagement face 404 and a lower engagement face 406. The release lever 354 is pivotally supported between the inner and outer plates 350,352 by a pivot 408, and operably interconnects the floor-latch mechanism 18b and the bracket 270. The pivot 408 includes a first keyed cylindrical section 410, a central cylindrical section 412 having a bearing surface 414, a second keyed cylindrical section 416, a third cylindrical section 418 having a bearing surface 420, and an extending cylindrical section 422 having a notch 424 formed therein. The first and second keyed cylindrical sections 410,416 are respectively received into keyed apertures 426,428 of the outer and inner plates 350,352, whereby the pivot 408 is rotationally fixed relative thereto. The central cylindrical section 412 is received through the pivot aperture 400 of the release lever 354 for enabling rotational motion of the release lever 354 about the bearing surface 414.

Figure 4:
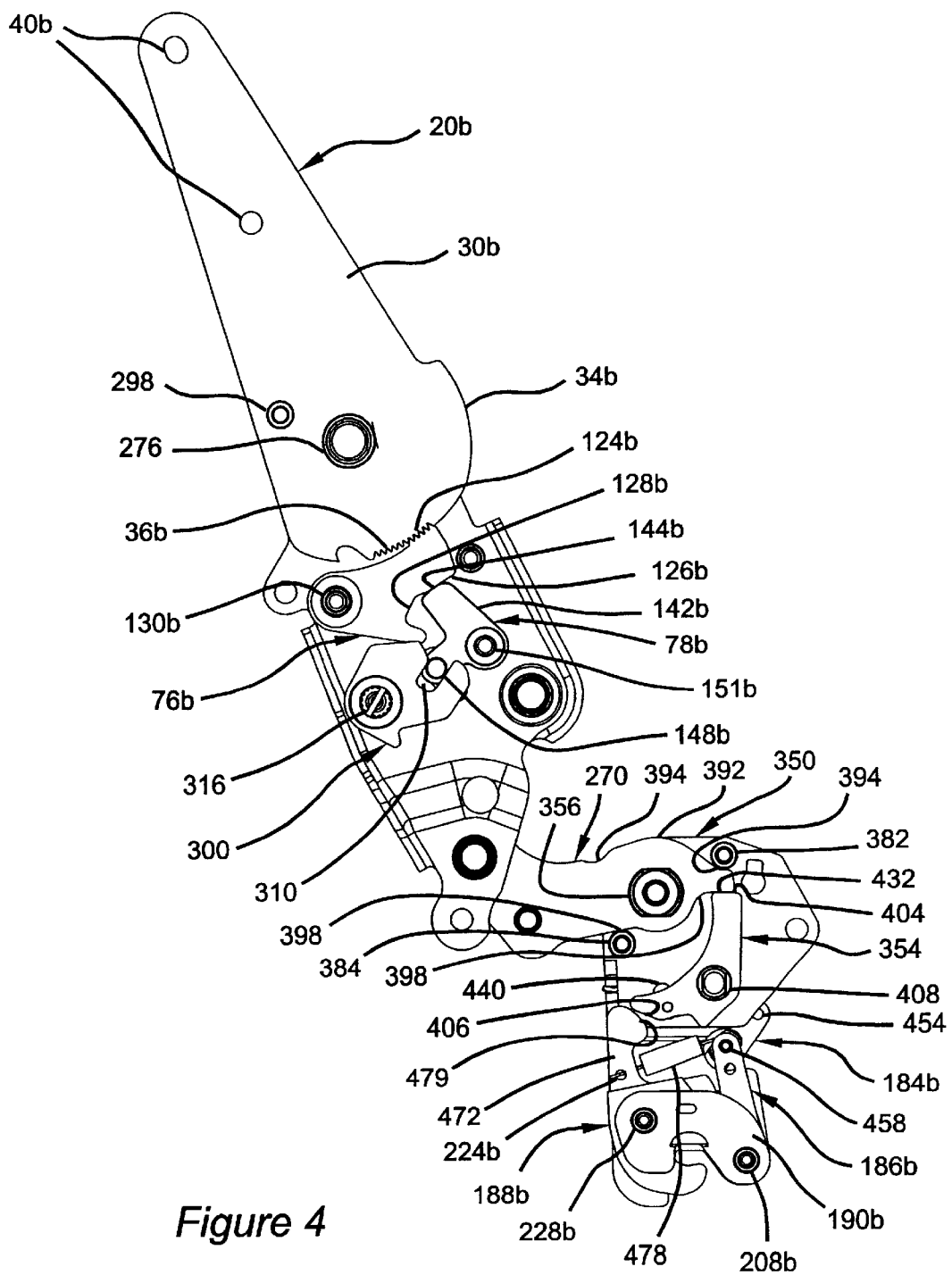
FIG. 4 is a side view of a second half of the recliner and floor-latch assembly of FIG. 1 having outer plates removed.
Figure 5A:
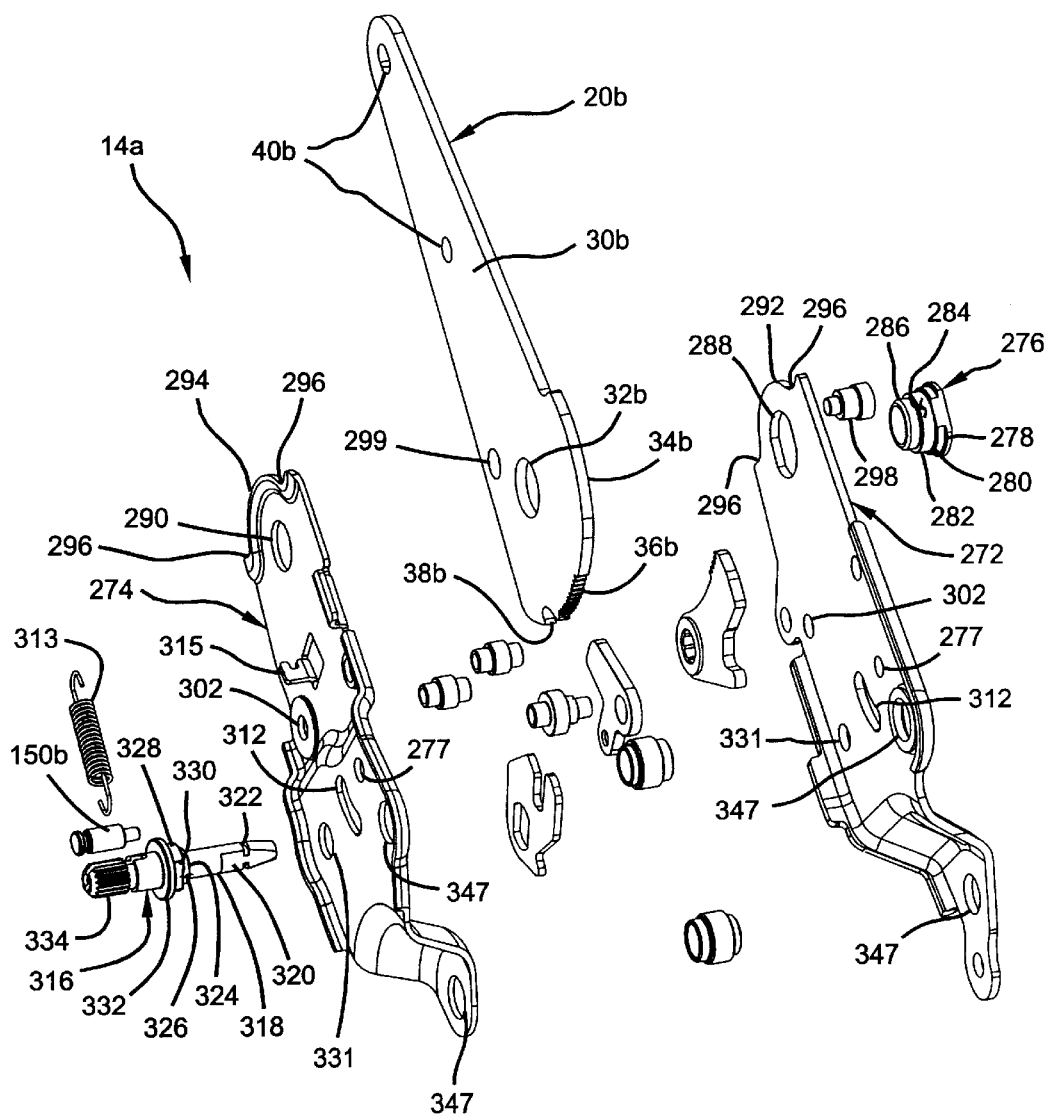
FIG. 5A is an exploded view of recliner components of the second half of the recliner and floor-latch assembly.
Figure 5B:
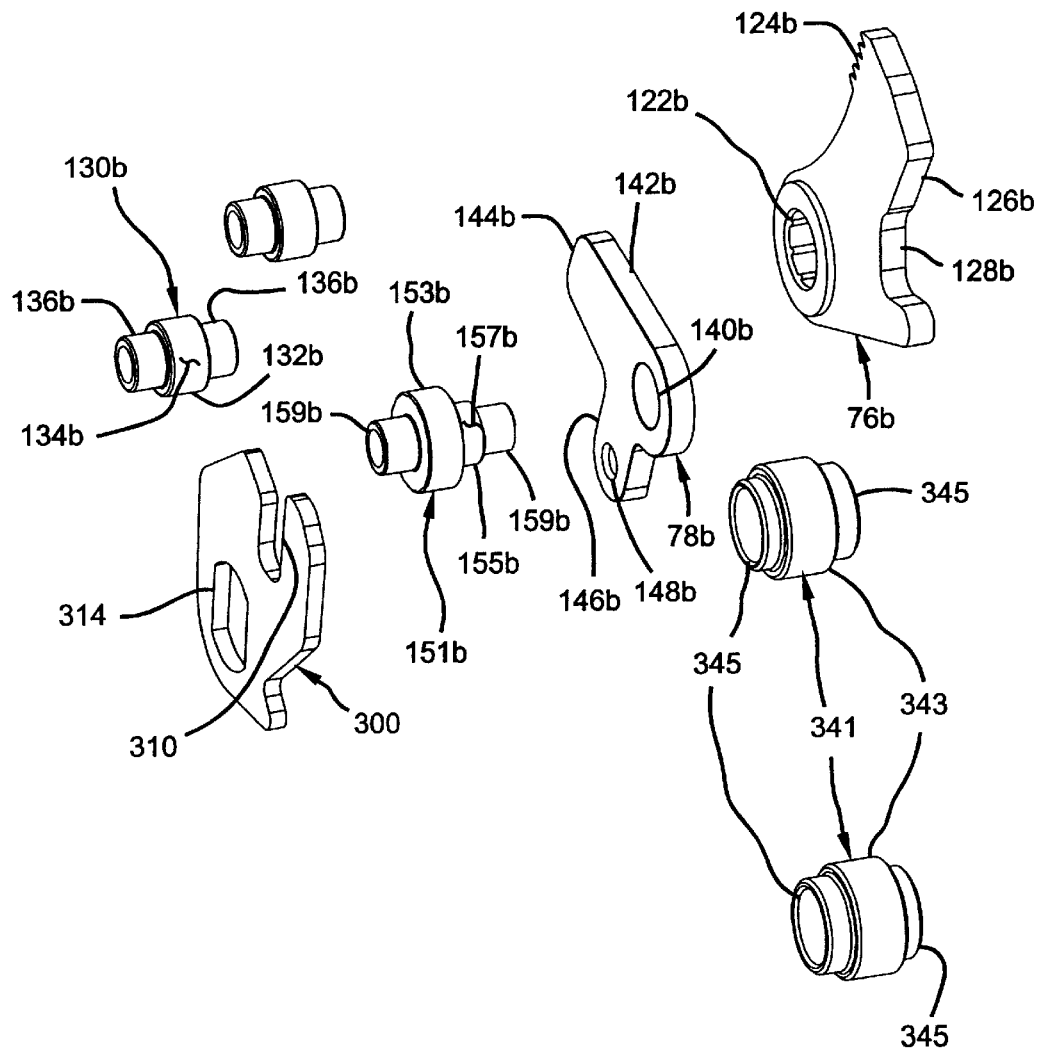
FIG. 5B is a detailed view of the recliner components of FIG. 5A.
Figure 6A:
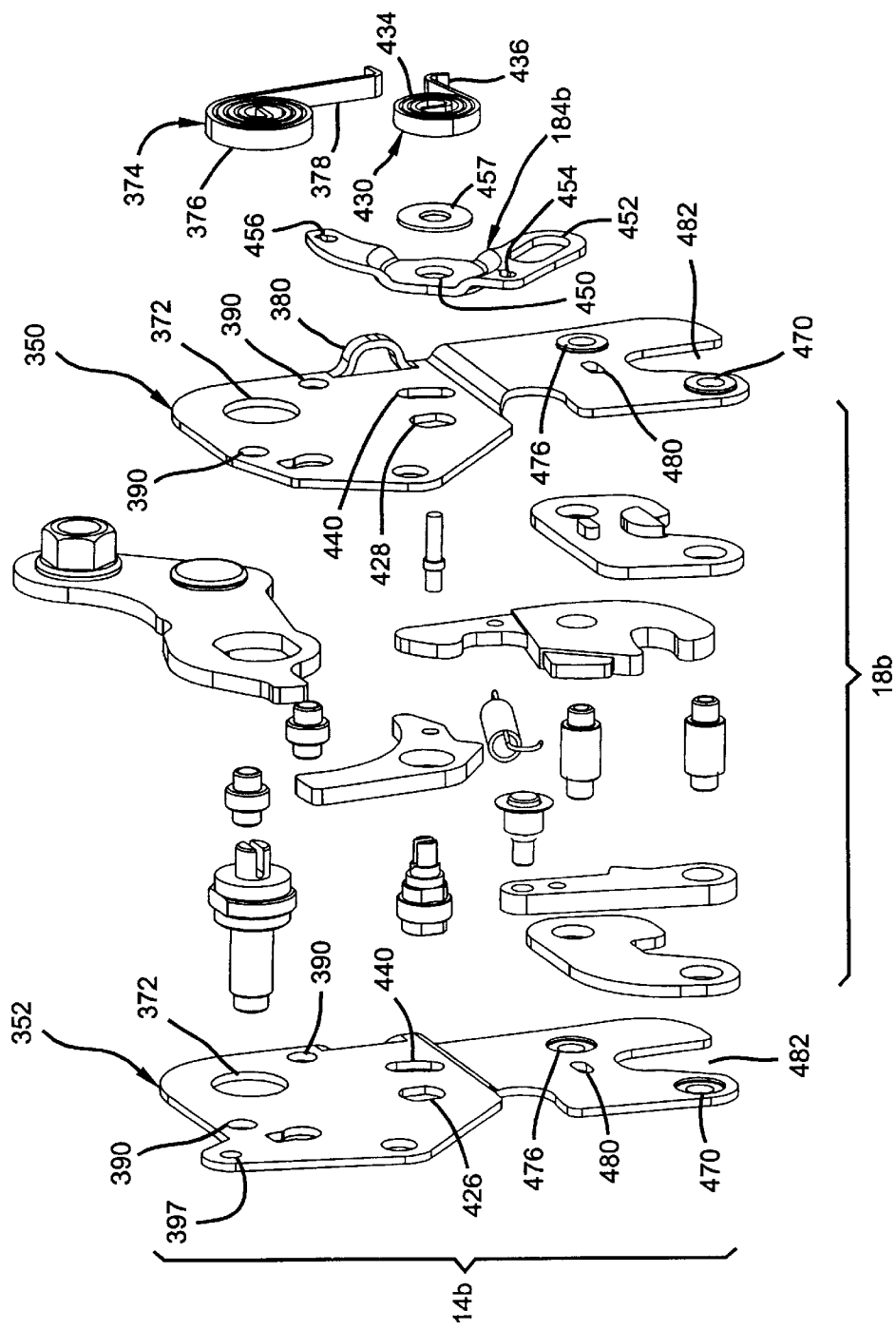
FIG. 6A is an exploded view of floor-latch components of the second half of the recliner and floor-latch assembly.
Figure 6B:
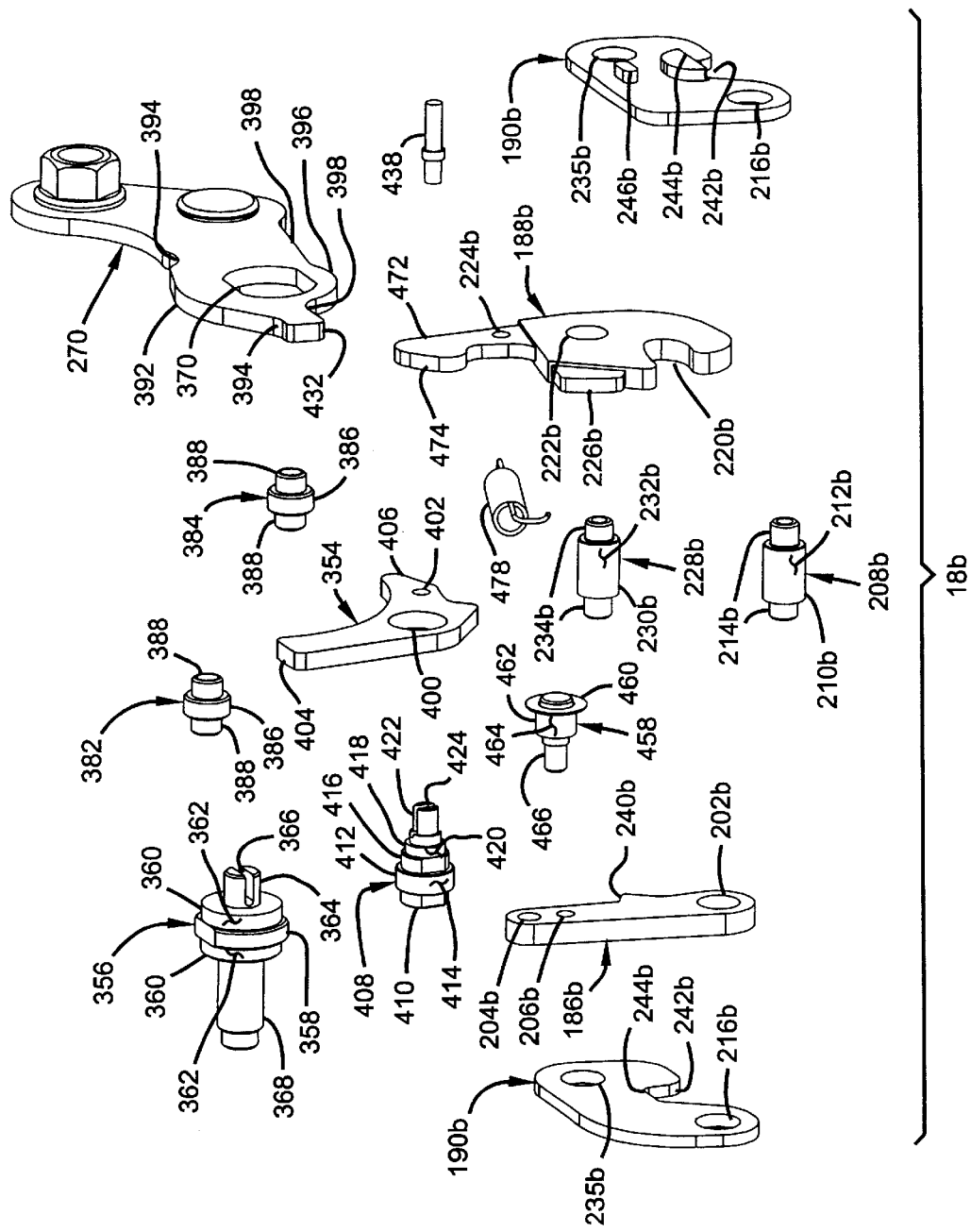
FIG. 6B is a detailed view of the floor-latch components of FIG. 6A.

The release lever 354 is biased in a counter-clockwise (CCW) direction, as shown in FIG. 4, by a coil spring 430, whereby the upper engagement face 404 engages a corresponding face 432 of the bracket 270. The coil spring 430 includes a central flat 434 disposed within the notch 424 of the pivot 408 and an outwardly extending arm 436 engaging a biasing post 438. The biasing post 438 seats within and extends from the release lever 354, extending through a slot 440 of the inner plate 350 for engagement with the extending arm 436. In this manner, the coil spring 430 biases the release lever 354 into engagement with the bracket 270.

The latch-release lever 184a includes a pivot aperture 450, an engagement slot 452, a transfer cable attachment point 454 and an interlock cable attachment point 456. The latch-release lever 184b is pivotally supported on the inner plate 350 by the pivot 408, whereby the third cylindrical section 418 is received through the pivot aperture 450 to enable rotation of the latch-release lever 184b about the bearing surface 420. The coil spring 430 lies adjacent to the latch-release lever 184b, separated therefrom by a washer 457. A latch post 458 operably interconnects the latch-release lever 184b and the locking lever 186b. The latch post 458 includes a disc end 460, a first cylindrical section 462 having a bearing surface 464, and a second cylindrical section 466. The latch post 458 is received through the engagement slot 452 of the latch-release lever 184b, whereby edges of the engagement slot 452 slidably engage the bearing surface 464. The latch post 458 is securely fixed to the locking lever 186b, as described immediately below. The interlock cable 268 is attached at the interlock cable attachment point 456 to operably interconnect the interlock plate 260 and the latch-release lever 184b.

The locking lever 186b includes a pivot aperture 202b, an attachment aperture 204b and a spring aperture 206b. The second cylindrical section 466 of the latch post 458 is fixedly secured within the attachment aperture 204b for operably engaging the locking lever 186 and the latch-release lever 184b. The locking lever 186b is pivotally supported about a pivot 208b including a central cylindrical section 210b having a bearing surface 212b and side cylindrical sections 214b. The central cylindrical section 210b is received through the pivot aperture 202b of the locking lever 186b, and apertures 216b of the support plates 190b. The side cylindrical sections 214b are received into apertures 470 of the inner and outer plates 350,352 for supporting the floor-latch mechanism 18b therebetween.

The latch 188b includes a latching notch 220b, a pivot aperture 222b, a spring attachment aperture 224b, a locking face 222b, and an upward extending release cam 472 having a cam surface 474. The latch 188b is pivotally supported by the support plates 190b on a pivot 228b having a central cylindrical section 230b with a bearing surface 232b and side cylindrical sections 234b. The central cylindrical section 230b is received through the pivot aperture 222b of the latch 188b and the side cylindrical sections 234b are received through apertures 235b of the support plates 190b and into apertures 476 of the inner and outer plates 350,352 to support the floor-latch mechanism 18b therebetween. A spring 478 is anchored between the locking lever 186b and the latch 188b. In this manner, a locking nub 240b of the locking lever 186a is biased into engagement with the locking face 226b of the latch 188b for securing the latch 188b. The cam surface 474 selectively engages the lower engagement face 406 of the release lever 354 enabling actuation of the release lever 354 against the biasing force of the coil spring 430.

The support plates 190b each include a striker recess 242b having a top flat 244b and an outward anchor extension 246b. The anchor extensions 246b seat within corresponding apertures 480 of the inner and outer plates 350,352 for supporting the floor-latch mechanism 18b therebetween. The inner and outer plates 350,352 each include a striker aperture 482 for receiving a striker, as discussed in further detail hereinbelow.

Figure 1:
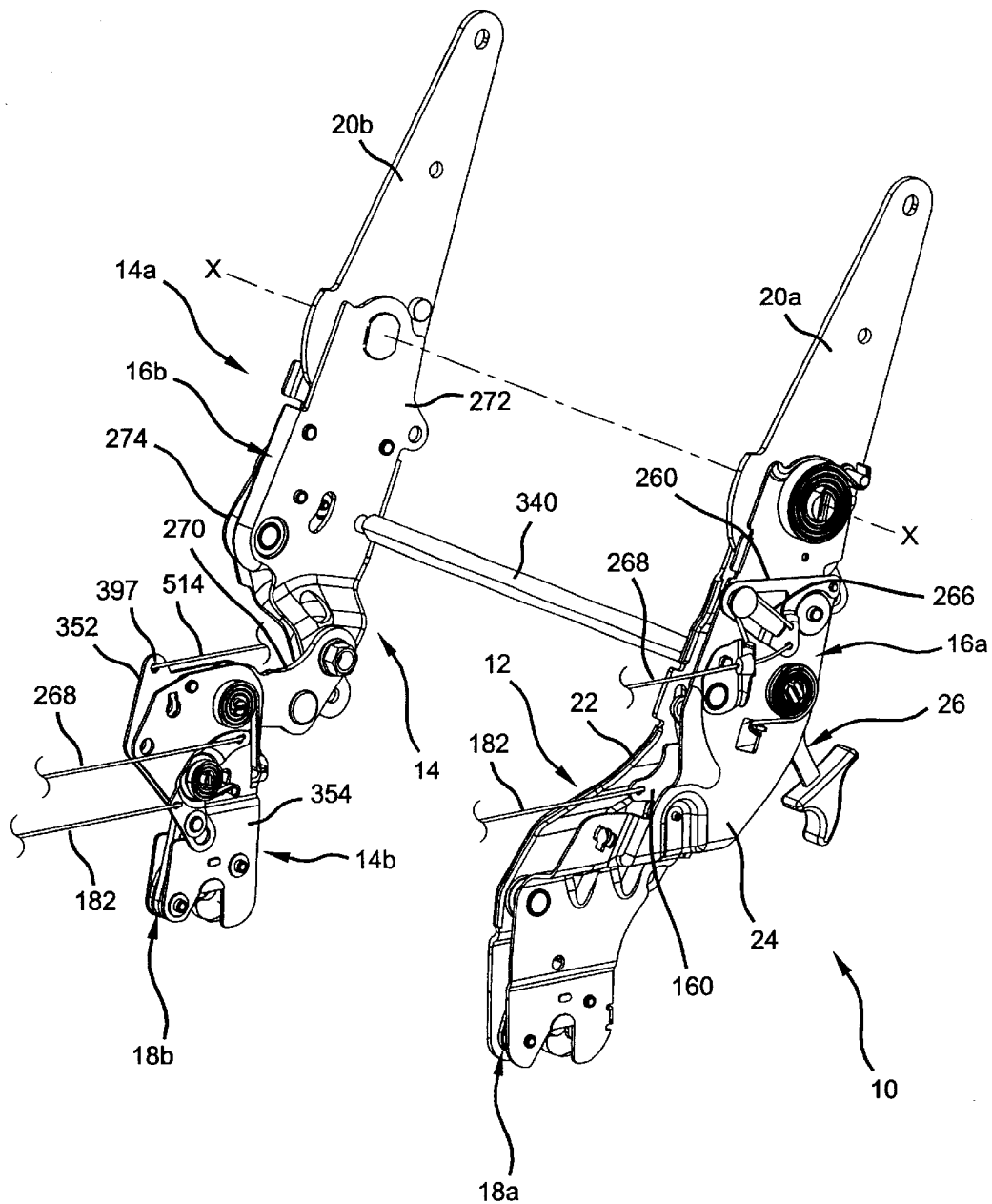
FIG. 1 is a perspective view of a recliner and floor-latch assembly in accordance with the principles of the present invention.
Figure 2:
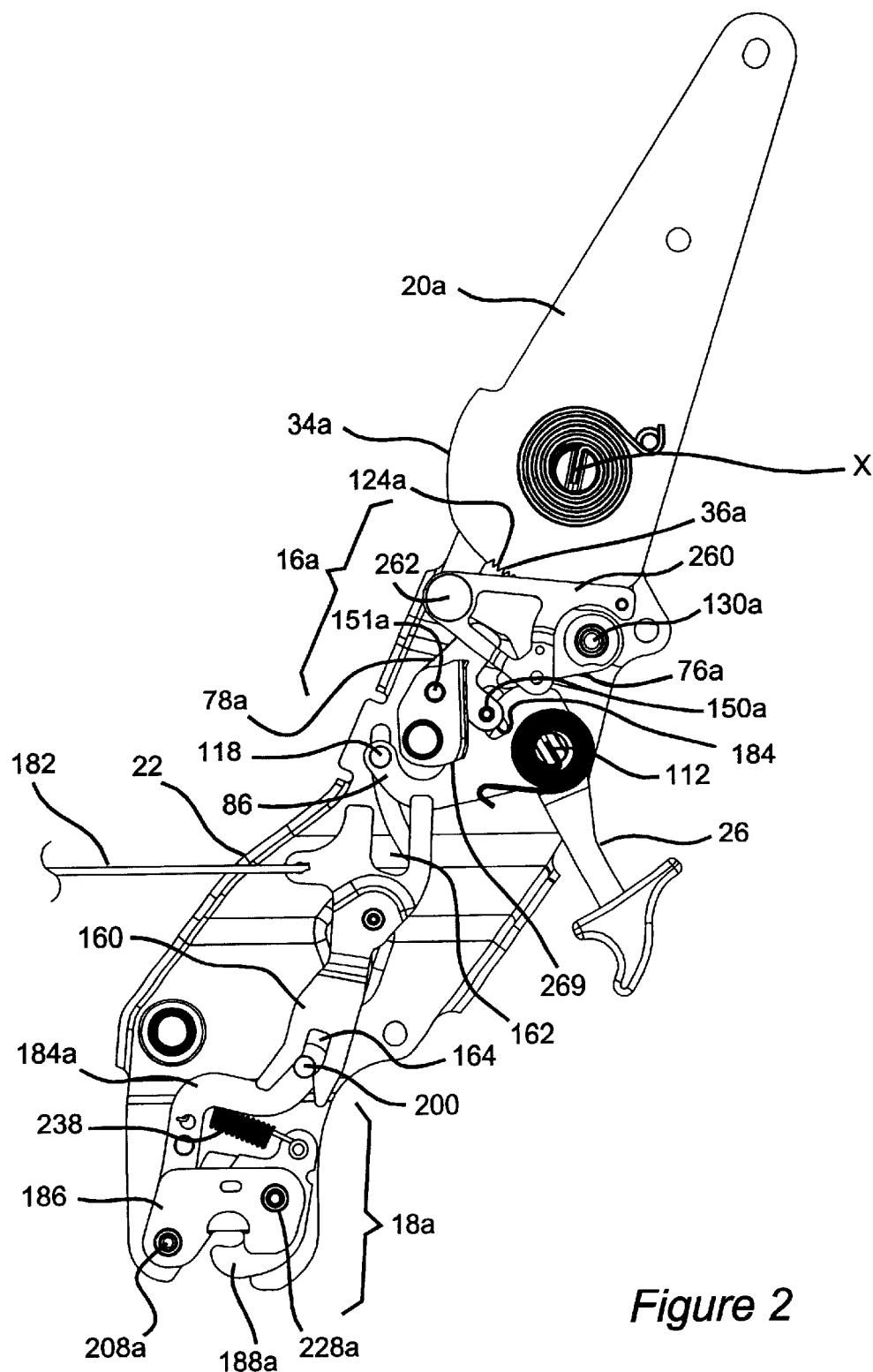
FIG. 2 is a side view of a first half of the recliner and floor-latch assembly of FIG. 1 having an outer plate removed.
Figure 3A:
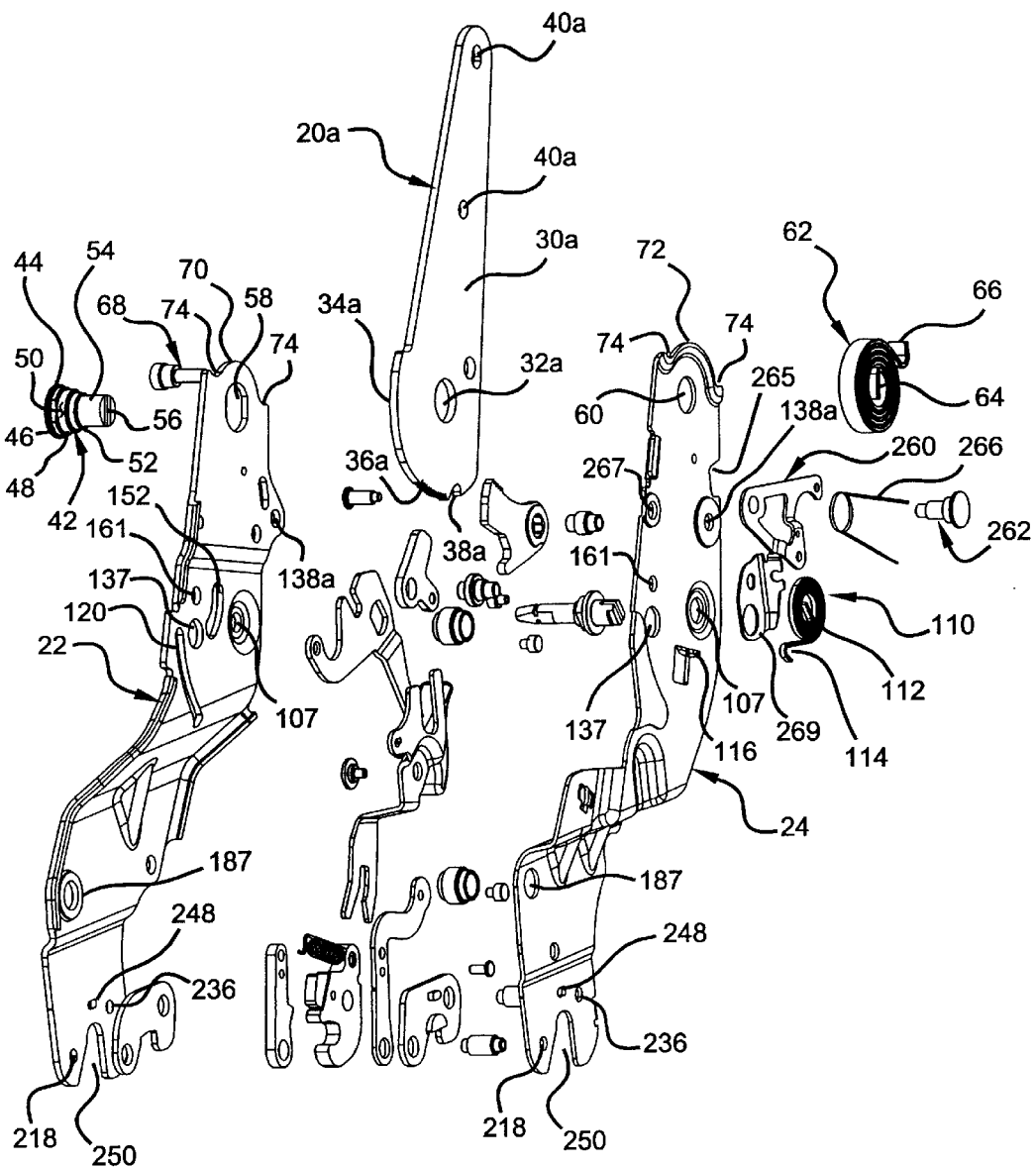
FIG. 3A is an exploded view the first half of the recliner and floor-latch assembly.
Figure 3B:
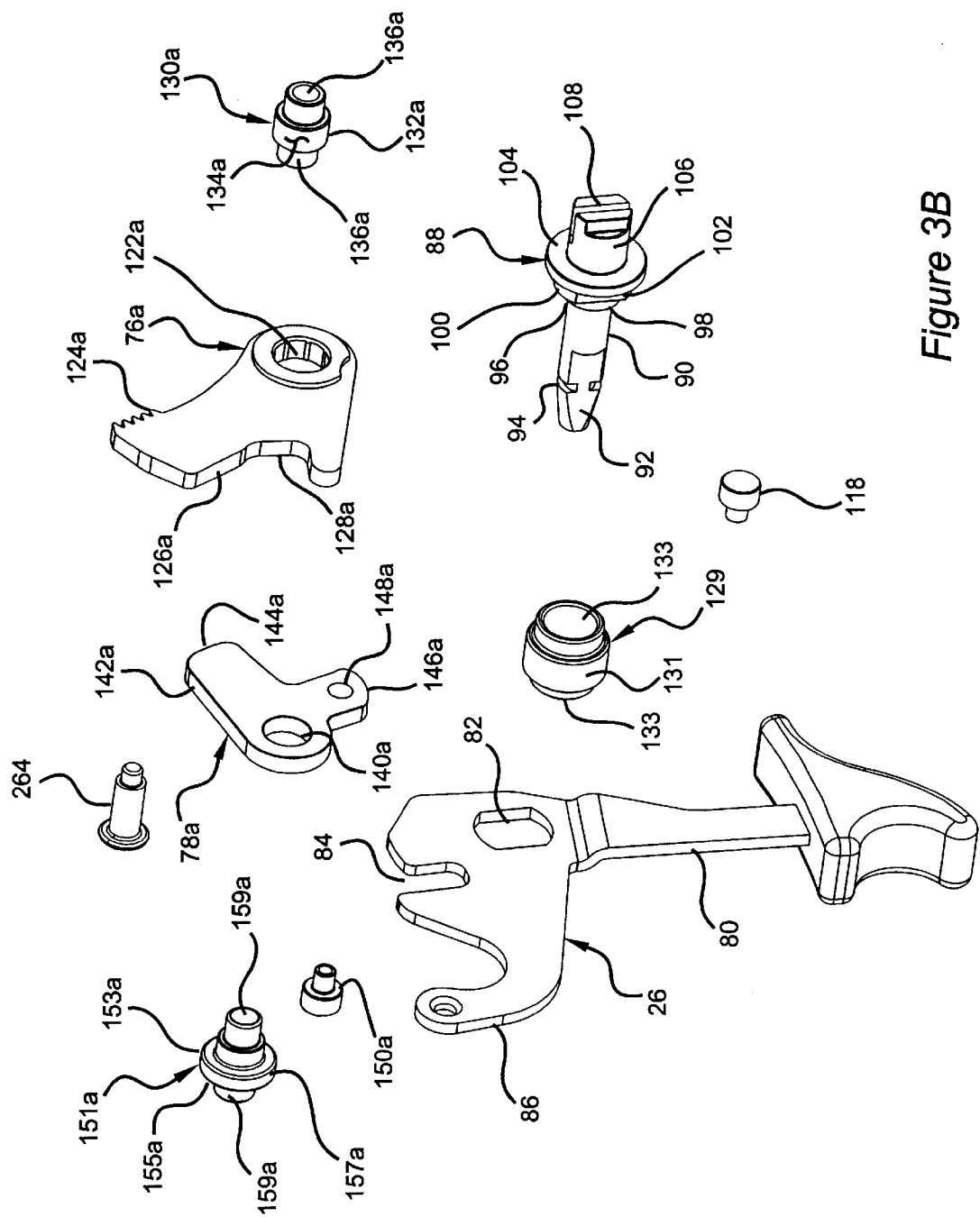
FIG. 3B is a detailed exploded view of recliner components of the first half of the recliner and floor-latch assembly.
Figure 3C:
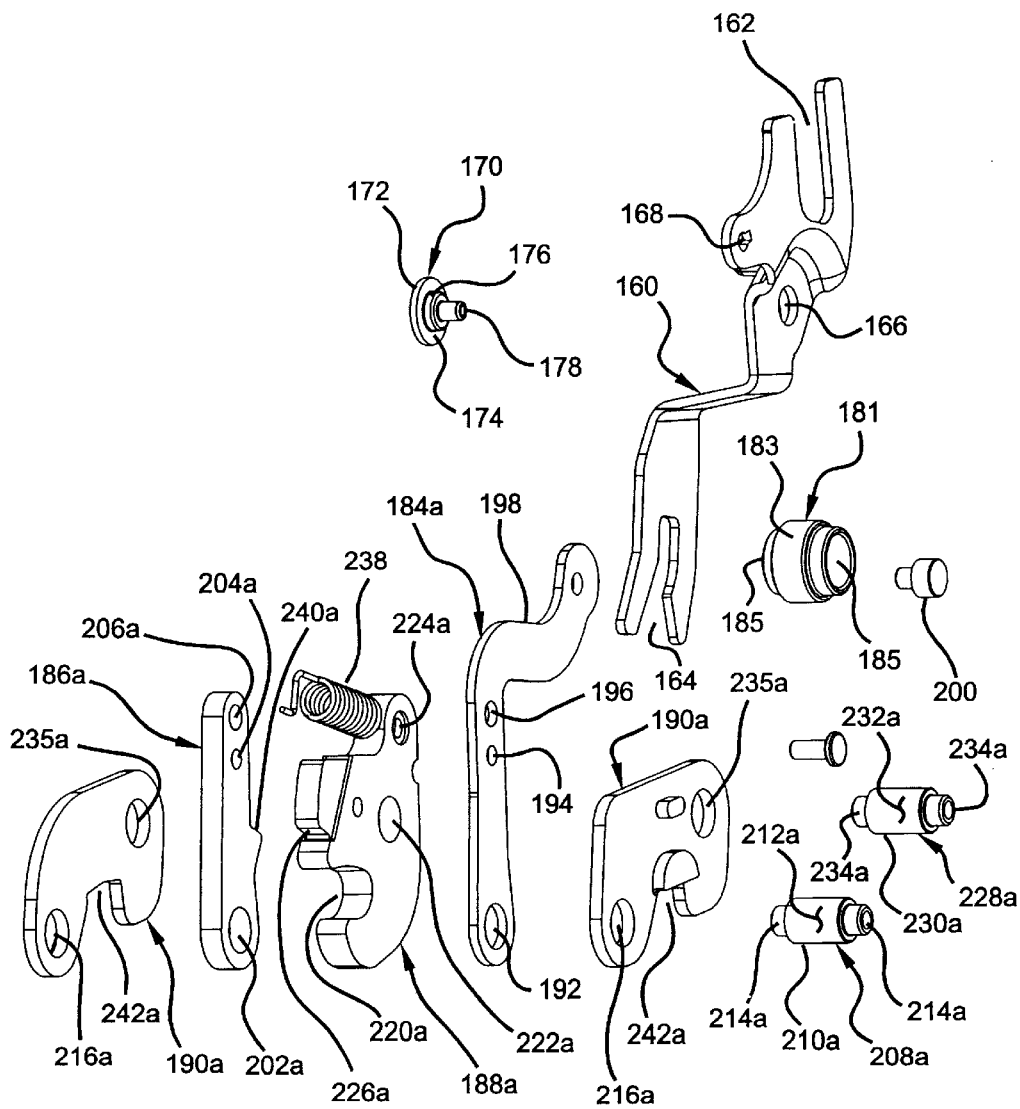
FIG. 3C is a detailed exploded view of floor latch components of the first half of the recliner and floor-latch assembly.

With reference to FIGS. 2, 4; 7 and 8, operation of the RFL mechanism will be described in detail. It should be noted that in each of these Figures, the outer plates 24, 274 and 352 are removed to provide a clear view of the internal components. Initially, either the actuation lever 26 of the first RFL half or the actuation lever (not shown) of the second RFL half is operable to a first position to enable reclining or forward-folding motion of the seat-back supports 20a, 20b. It should be noted that operation of either actuation lever results in concurrent actuation of the other, via interconnection of the spindles 88,316. Operation to the first position imparts actuation of the recliner cams 78a, 78b to disengage the pawls 76a, 76b from the seat-back supports 20a, 20b. Disengagement of the pawls 76a, 76b from the seat-back supports 20a, 20b enables the seat-back supports 20a, 20b to recline against the biasing force of the coil spring 62 or forward folding of the seat-back supports 20a,b.

Further operation of the actuation levers to a second position enables operation of the floor-latch mechanisms 18a, 18b. As the actuation lever 26 of the first RFL half 12 moves to the second position, as shown in FIG. 7, the transfer lever 160 articulates to concurrently actuate the floor-latch mechanism 18a via the latch-release lever 184a and pull the transfer cable 182 to actuate the floor-latch release mechanisms 18a, 18b via the latch-release lever 184b. Actuation of the latch-release levers 184a, 184b pulls the locking levers 186a, 186b against the bias of the springs 238,478, whereby the locking nubs 240a, 240b disengage the locking surfaces 226a, 226b of the latches 188a, 188b. In this manner, the latches 188a, 188b are caused to pivot about the pivot 228a, 228b, moving to an open position, as shown in FIGS. 7 and 8. Pivoting of the latch 188b enables the cam surface 474 of the latch 188b to engage the release lever 354 and disengage the release lever 354 from the bracket 270, as seen in FIG. 8.

As discussed above, if either floor-latch release mechanisms 18a, 18b are not fully secured, the interlock plate 260 prevents the seat-back supports 20a, 20b from returning to a use or upright position. Specifically, if the floor-latch release mechanism 18a of the first RFL half 12 is not fully secured, the transfer lever 160 remains in a mid-actuated position, thereby causing the latch-release lever 184b of the floor-latch mechanism 18b to also be in a mid-actuated position through the transfer cable 182. The mid-actuated position of the latch-release lever 184b causes the interlock cable 268 to be slack, thereby allowing upward biasing of the interlock plate 260 against the seat-back support 20a. Similarly, if the floor-latch mechanism 18b of the second RFL half 14 is not fully secured, the latch-release lever 184b remains in a mid-actuated position, similarly causing the interlock cable 268 to be slack.

With reference to FIGS. 9 through 11, a seat assembly 500 implementing the RFL mechanism 10 will be described in detail. The seat assembly 500 includes a seat-back frame 502 fixedly attached to the seat-back supports 20a, 20b and a seat frame 504 fixedly attached to the first and second RFL halves 12,14. The seat frame 504 is pivotally attached to a pair of brackets 506, secured to a floor 508, about a pivot axis Y. The floor 508 includes recesses 510 each having a striker 512 fixedly disposed therein. The strikers 512 align with and are selectively engaged by the floor-latch mechanisms 18a, 18b.

An actuation cable 514 (shown in phantom) operably interconnects one of the brackets 506 and the floor-latch portion 14b. Specifically, a first end 513 of the cable 514 is interconnected to an anchor point 516 of the bracket 506 and runs the length of the seat frame 502. A second end 515 of the cable 514 is anchored to the actuation cable attachment point 397 of the outer plate 352. The operable interconnection between the recliner portion 14b and the bracket 506, through the actuation cable 514, enables pivoting of the recliner portion 14b on the bracket 270, about the pivot 356, as discussed further below.

To dump the seat assembly 500 forward to a stowed position, the RFL mechanism 10 is actuated to initially release the seat-back supports 20a, 20b, as described above, for forward folding of the seat-back frame 502 relative to the seat frame 504. With the seat-back frame 502 in a forward-fold position, the RFL mechanism 10 is further actuated to disengage the floor-latch mechanism 18a, 18b from the strikers 512. With the strikers 512 disengaged, the seat assembly 500 may be dumped to a stowed position about the pivot axis Y. As the seat assembly 500 pivots forward, the actuation cable 514 is pulled by the bracket 506, thereby pulling on the recliner portion 14b. In this manner, the recliner portion 14b retracts by pivoting about the pivot 356, against the bias of the coil spring 374 to stow the recliner portion 14b adjacent the seat frame 504.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat recliner and latch apparatus for implementation with a seat that is selectively engageable with a floor having a striker and pivotal about a remote axis relative to the floor, the seat recliner and latch apparatus comprising:
   a housing;
   an upper quadrant rotationally supported by said housing;
   a recliner mechanism supported by said housing and operably engaging said upper quadrant;
   a latch mechanism pivotally supported by said housing and operable to selectively engage the striker of the floor;
   an actuation mechanism in operable communication with said recliner mechanism and said latch mechanism, said actuation mechanism operable in a first position wherein said recliner mechanism is operable to enable selective rotational adjustment of said upper quadrant relative to said housing and in a second position wherein said latch mechanism is operable to disengage the striker; and
   an interlock operably engaged with said latch mechanism and in selective engagement with said quadrant, said interlock limiting a range of rotation of said quadrant when said latch mechanism is disengaged from the striker.

2. The seat recliner and latch apparatus of claim 1, further comprising a pivot axis about which said latch mechanism is pivotally supported, wherein said latch mechanism rotates about said pivot axis as the seat pivots about the remote axis.

3. The seat recliner and latch apparatus of claim 1, wherein said recliner mechanism comprises:
   a recliner cam pivotally supported by said housing and operably interconnected to said actuation mechanism; and
   a pawl pivotally supported by said housing and in operable communication with said recliner cam and selectively engaged with said quadrant for prohibiting rotation of said quadrant.

4. The seat recliner and latch apparatus of claim 1, wherein said latch mechanism comprises:
   a latch pivotally supported by said housing and selectively engaging the striker; and
   a locking lever pivotally supported by said housing and in selective engagement with said latch for prohibiting pivoting of said latch.

5. The seat recliner and latch apparatus of claim 4, wherein said latch and said locking member are resiliently interconnected for biasing relative pivotal rotation of one another.

6. The seat assembly of claim 4, wherein said latch and said locking member are resiliently interconnected for biasing relative pivotal rotation of one another.

7. The seat recliner and latch apparatus of claim 1, wherein said actuation mechanism comprises:
   an actuation lever selectively engaging said recliner mechanism; and
   a transfer plate selectively engaging said actuation lever and said latch mechanism.

8. The seat recliner and latch apparatus of claim 7, wherein said actuation lever is operable in three positions, a neutral position wherein said actuation mechanism is disengaged from both said recliner mechanism and said latch mechanism, said first position wherein said actuation mechanism engages said recliner mechanism, and said second position wherein said actuation mechanism engages both said recliner mechanism and said latch mechanism.

9. The seat recliner and latch apparatus of claim 1, wherein said actuation mechanism comprises:
   an actuation lever selectively engaging said first recliner mechanism;
   a transfer plate selectively engaging said actuation lever and said first latch mechanism; and
   an actuation plate in operable communication with said actuation lever and selectively engaging said second recliner mechanism.

10. The seat recliner and latch apparatus of claim 9, wherein said second latch mechanism is in operable communication with said transfer plate.

11. The seat recliner and latch apparatus of claim 9, wherein said actuation lever is operable in three positions, a neutral position wherein said actuation mechanism is disengaged from said first and second recliner mechanisms, and said latch mechanism, said first position wherein said actuation mechanism engages said first and second recliner mechanisms, and said second position wherein said actuation mechanism engages said first and second recliner mechanisms and said first latch mechanism.

12. The seat assembly of claim 1, wherein said recliner mechanism comprises:
   a recliner cam pivotally supported by said housing and operably interconnected to said actuation mechanism; and
   a pawl pivotally supported by said housing and in operable communication with said recliner cam and selectively engaged with said quadrant for prohibiting rotation of said quadrant.

13. The seat assembly of claim 1, wherein said latch mechanism comprises:
   a latch pivotally supported by said housing and selectively engaging the striker; and
   a locking lever pivotally supported by said housing and in selective engagement with said latch for prohibiting pivoting of said latch.

14. The seat assembly of claim 1, wherein said actuation mechanism comprises:
   an actuation lever selectively engaging said recliner mechanism; and
   a transfer plate selectively engaging said actuation lever and said latch mechanism.

15. The seat assembly of claim 14, wherein said actuation lever is operable in three positions, a neutral position wherein said actuation mechanism is disengaged from both said recliner mechanism and said latch mechanism, said first position wherein said actuation mechanism engages said recliner mechanism, and said second position wherein said actuation mechanism engages both said recliner mechanism and said latch mechanism.

16. A seat latch and recliner apparatus for implementation with a seat that is selectively engageable with a floor having first and second strikers and pivotal about a remote axis relative to the floor, the seat recliner and latch apparatus comprising:
   a first apparatus half comprising:
      a first housing;
      a first quadrant rotationally supported by said first housing;
      a first recliner mechanism supported by said housing and in operable engagement with the first quadrant and said actuation lever;
      a first latch mechanism supported by said housing and in operable engagement with said first recliner mechanism;
   a second apparatus half comprising:
      a second housing
      a second quadrant rotationally supported by said second housing;
      a second recliner mechanism supported by said second housing and operably engaging said second quadrant;
      a second latch mechanism pivotally supported by said second housing and operable to selectively engage the second striker of the floor;
   an actuation mechanism in operable communication with said first and second recliner mechanisms and said first and second latch mechanisms, said actuation mechanism operable in a first position wherein said first and second recliner mechanisms are operable to enable selective rotational adjustment of said first and second quadrants relative to said first and second housings and in a second position wherein said first and second latch mechanisms are operable to disengage the first and second strikers; and
   an interlock operably engaged with said second latch mechanism and in selective engagement with said first quadrant, said interlock limiting a range of rotation of said first quadrant when said second latch mechanism is disengaged from said second striker.

17. The seat recliner and latch apparatus of claim 16, further comprising a pivot axis about which said second latch mechanism is pivotally supported, wherein said second latch mechanism rotates about said pivot axis as the seat pivots about the remote axis.

18. The seat recliner and latch apparatus of claim 16, wherein said first recliner mechanism comprises:
   a recliner cam pivotally supported by said first housing and operably interconnected to said first actuation mechanism; and
   a pawl pivotally supported by said first housing and in operable communication with said recliner cam and selectively engaged with said first quadrant for prohibiting rotation of said first quadrant.

19. The seat recliner and latch apparatus of claim 16, wherein said first latch mechanism comprises:
   a latch pivotally supported by said first housing and selectively engaging the first striker; and
   a locking lever pivotally supported by said first housing and in selective engagement with said latch for prohibiting pivoting of said latch.

20. The seat recliner and latch apparatus of claim 19, wherein said latch and said locking member are resiliently interconnected for biasing relative pivotal rotation of one another.

21. The seat recliner and latch apparatus of claim 16, wherein said second recliner mechanism comprises:
   a recliner cam pivotally supported by said second housing and operably interconnected to said second actuation mechanism; and
   a pawl pivotally supported by said second housing and in operable communication with said recliner cam and selectively engaged with said second quadrant for prohibiting rotation of said second quadrant.

22. The seat recliner and latch apparatus of claim 16, wherein said second latch mechanism comprises:
   a latch pivotally supported by said second housing and selectively engaging the second striker; and
   a locking lever pivotally supported by said second housing and in selective engagement with said latch for prohibiting pivoting of said latch.

23. The seat recliner and latch apparatus of claim 22, wherein said latch and said locking member are resiliently interconnected for biasing relative pivotal rotation of one another.

24. A seat assembly selectively engaged with a striker of a floor and foldable relative to the floor, comprising:
   a seat;
   a seat back pivotally supported relative to said seat;
   a recliner and latch apparatus operably supporting said seat and said seat back, comprising:
      a housing supporting said seat;
      an upper quadrant rotationally supported by said housing and to which said seat back is fixed;
      a recliner mechanism supported by said housing and operably engaging said upper quadrant;
      a latch mechanism pivotally supported by said housing and operable to selectively engage the striker of the floor;
      an actuation mechanism in operable communication with said recliner mechanism and said latch mechanism, said actuation mechanism operable in a first position wherein said recliner mechanism is operable to enable selective rotational adjustment of said upper quadrant relative to said housing and in a second position whereby said latch mechanism is operable to disengage the striker; and
   an interlock operably engaged with said latch mechanism and in selective engagement with said quadrant, said interlock limiting a range of rotation of said quadrant when said latch mechanism is disengaged from the striker.

25. The seat assembly of claim 24, further comprising a pivot axis about which said latch mechanism is pivotally supported, wherein said latch mechanism rotates about said pivot axis as the seat assembly pivots about a remote axis.

* * * * *